United States Patent Office

3,772,293
Patented Nov. 13, 1973

3,772,293
SINGLE STEP SYNTHESIS OF TRIETHYLENE DIAMINE
Merwin D. Oakes, Chester, Lawrence L. Upson, Wallingford, and Martin H. Ziv, Springfield, Pa., assignors to Air Products and Chemicals, Inc., Wayne, Pa.
No Drawing. Filed Dec. 13, 1971, Ser. No. 207,557
Int. Cl. C07d 51/70
U.S. Cl. 260—268 T        9 Claims

ABSTRACT OF THE DISCLOSURE

Triethylene diamine, important as a catalyst for polyurethane formation, is prepared in a one-step process in high yields directly from piperazine and ethylene oxide.

BACKGROUND OF THE INVENTION

(1) Field of the invention

This invention relates to compounds which contain a hexahydropyrazine nucleus. The invention, in particular, relates to an improved method for the production of triethylene diamine, which is also known as 1,4-diazabicyclo-(2,2,2)-octane.

(2) Description of the prior art

It is known that triethylene diamine can be produced by reacting N-β-hydroxyethyl piperazine or N,N'-di-β-hydroxyethyl piperazine in the vapor state over an aluminum silicate catalyst [T. Ishiguro et al., J. Pharm. Soc., Japan, 75 pp. 1370–1373 (1955)]. This method gives yields only ranging from about 20 to 30%.

According to the method of U.S. Pat. No. 3,080,371, triethylene diamine can also be obtained by heating N-β-hydroxyethyl piperazine or N,N'-di-β-hydroxyethyl piperazine with a carboxylic acid at temperatures between 250 and 350° C.

Another process for the production of triethylene diamine is provided in U.S. Pat. No. 3,297,701, whereby hydroxyethyl- and di-hydroxyethyl piperazine feed stocks are contacted with a metal phosphate catalyst.

The N-β-hydroxyethyl piperazine and N,N'-di-β-hydroxyethyl piperazine suggested as feed stocks in the prior art have conventionally been prepared by ethoxylating piperazine with ethylene oxide. The ethylene oxide is sometimes used in excess to achieve more complete conversion of the piperazine. This technique, however, insures that their product of reaction will contain a mixture of the hydroxyethyl and di-hydroxyethyl piperazines. But, the di-hydroxyethyl piperazine is less desirable since it presents severe processing problems. It is difficult to vaporize, cokes causing catalyst deactivtion and is less selective to forming triethylene diamine than is the monohydroxyethyl piperazine.

The reaction of piperazine and ethylene oxide is highly selective to N-β-hydroxyethyl piperazine up to a piperazine conversion of 30%. Beyond this level of conversion, the rate of the less desirable N,N'-di-β-hydroxyethyl piperazine formation increases rapidly. Thus, in commercial operation a separate processing step is required to separate N-β-hydroxyethyl piperazine from unreacted piperazine at about 30% piperazine conversion and recycle the unconverted piperazine to obtain high N-β-hydroxyethyl piperazine selectivity. The monohydroxyethyl piperazine thus obtained can be reacted by one of the previously cited methods to produce triethylene diamine.

There has been an increasing demand for triethylene diamine in recent years. It has become an important industrial product, due primarily to its employment as a catalyst in the production of polyurethane chemicals. Consequently, there is a real need for a simplified method of synthesis coupled with high yield of product, thereby resulting in a lowered production cost.

SUMMARY OF THE INVENTION

A more simple method of producing triethylene diamine has now been found. Piperazine and ethylene oxide are reacted over a siliceous cracking catalyst, thereby synthesizing triethylene diamine directly in good yields. The piperazine may be contained in a suitable inert solvent prior to carrying out the reaction.

The ethylene oxide should be present in the ratio of about 1 to about 5 moles, and preferably about 1 to about 2 moles per mole of piperazine.

The reaction conditions of temperature and pressure to be employed are within the range of 500–900° F. and .05–2.0 atmospheres absolute and preferably within the range of 600–750° F. and 0.8–1.2 atmospheres absolute. It is generally preferable to carry out the reaction in the vapor phase.

The catalyst used can be a silica-alumina cracking catalyst, preferably prepared by the activation of clays of the kaolin family. Acid-activated bentonite clays and gels of the silica-alumina type, or siliceous gels containing zirconia or magnesia substituted for all or part of the alumina, may also be employed as the catalyst for the reaction, under substantially similar operating conditions. Siliceous cracking catalysts generally have surface areas of at least 80 m.²/g., while the preferred silica-alumina catalysts contain larger surface areas. Generally, the larger the catalyst surface area, the higher is its activity and consequently the lower is the reaction temperature required for optimum results.

Other catalysts which should be effective for the reaction system are metal phosphates. Examples of such compounds are aluminum phosphate, calcium phosphate and iron phosphate, such as are referred to in U.S. Pat. No. 3,297,701.

If desired, the piperazine reactant may be dissolved in a suitable solvent and be sent to the reactor as a liquid feed. The LHSV (liquid hourly space velocity in terms of volume of liquid per volume of catalyst per hour) of the liquid feed should be from about 0.01 to 2.0 and preferably from about 0.2 to about 0.4. Solvents which may be used should be inert and not contain any reactive groups. Among the solvents to be specially considered are water and hydrocarbons such as light aromatic, aliphatic, and naphthenic mineral oils, and alkylated or aralkylated benzene or naphthalene, more especially xylene.

Although the theory of the disclosed reaction is not fully understood, the following suggested reaction mechanism is highly probable. The rate of formation of N,N'-di-β-hydroxyethyl piperazine increases as the concentration of N-β-hydroxyethyl piperazine increases, since this reaction proceeds stepwise from the combination of piperazine and ethylene oxide to yield N-β-hydroxyethyl piperazine, which yields N,N'-di-β-hydroxyethyl piperazine. Up to a piperazine conversion of about 30 mol percent, the reaction approaches 100% selectivity to forming the monohydroxyethyl piperazine, which is the preferred intermediate product. By immediately converting the monohydroxyethyl piperazine formed to triethylene diamine, the production of the less desirable dihydroxyethyl piperazine is minimized while high piperazine conversions are allowed. Thus, the triethylene diamine product is produced in substantial yields.

Pure triethylene diamine can be obtained directly from the reaction mixture by conventional physical separation means, such as distillation or crystallization.

It is an object of this invention that piperazine and ethylene oxide can be reacted in a single step to produce triethylene diamine in good yields and at high piperazine conversion.

It is a further object of the invention that considerable economic advantages are obtained over existing multi-step processes for the production of triethylene diamine.

Other objects may be apparent from the following examples.

DESCRIPTION OF THE PREFERRED EMBODIMENT

The following examples are illustrative of the preferred embodiments of the invention. They are not, however, to be deemed limitative of the invention in any degree.

EXAMPLES 1 TO 5

Liquid feeds comprising piperazine and water in the concentrations shown in Table 1, were pumped from a 250 cc. glass burette through a transfer line to a reactor inlet located near the top of the reactor. A control valve located on the transfer line was automatically regulated to impose a pumping back-pressure to maintain even flow. The burette was heated with a heat lamp and the transfer line with electrical wiring to maintain temperatures of 120–150° F. Ethylene oxide was allowed to flow from a cylinder through a rotometer to a second transfer line which also connected at the top of the reactor. The cylinder was heated with a heat lamp to maintain a pressure of about 5 p.s.i.g.

The reactor, mounted vertically, was a 1" NPS Schedule 40 stainless steel pipe approximately 3½ ft. long. It contained, from bottom to top, a 1" bed of stainless steel wool, a 3" chipped quartz bed, a 10" catalyst bed, a 16" chipped quartz preheat bed and an 8" stainless steel wool bed—the latter located in the top section containing the feed transfer lines. The catalyst used in these examples was an activated kaolin in the pelleted form with a 0.175" average diameter and 0.17"–0.23" length.

A thermowell of ¼" diameter entered the reactor at the top and extended vertically downward along the reactor axis. Four thermocouples within the thermowell were connected to a temperature recorder. They were individually located so as to determine the temperature at the bottom of the chipped quartz preheat bed and at catalyst bed depths of 10%, 50% and 80% from the top of the bed.

The reactor was electrically heated with an insulated furnace extending from below the upper stainless steel wool bed to the bottom of the lower chipped quartz bed. The furnace contained three electrical circuits. One circuit heated the top 85% of the quartz bed, the second circuit the bottom 15% of the quartz preheat bed and the upper 50% of the catalyst bed and the third circuit the lower 50% of the catalyst bed. All of the circuits were connected to separate potentiometers. The upper two circuits were also connected to automatic temperature controllers.

The liquid feed and ethylene oxide entering the reactor from separate transfer lines joined at the top of the reactor and flowed downward. Reactor effluent discharged from the bottom of the reactor, which was connected to a stainless steel 24/40 mm. male taper joint fitted to a corresponding female joint which was attached to a 500 cc. three-necked glass flask used as the primary product receiver. The flask was connected to a glass trap and both were immersed in a Dry Ice-trichloroethylene bath. Most of the reactor effluent was cooled, condensed and collected in the three-necked flask. Vapor which passed through the flask was condensed in the glass trap.

Material collected in the trap was combined with the product from the flask and weathered (allowed to stand at atmosphere conditions and heat up to room temperature). This total product was analyzed by vapor phase chromatography with N-methyl pyrrolidone used as an internal standard. For ease in handling the effluent in the analytical procedure, the product containing the internal standard was diluted with absolute methanol.

The operating conditions, composition of the total reactor effluents, and yields of triethylene diamine for Examples 1 through 5 are reported in Table 1. This yield data was calculated by multiplying the ratio of the weight of triethylene diamine in the total reactor effluent based on liquid feed to the weight of piperazine in the feed by 100. The LHSV values shown in Table 1 are based on the liquid piperazine-water feed alone.

TABLE 1

| Example number | 1 | 2 | 3 | 4 | 5 |
|---|---|---|---|---|---|
| Composition of liquid feed: | | | | | |
| Piperazine, wt. percent | 25 | 25 | 25 | 25 | 25 |
| $H_2O$, wt. percent | 75 | 75 | 75 | 75 | 75 |
| LHSV | 0.24 | 0.29 | 0.3 | 0.47 | 0.48 |
| Moles ethylene oxide/moles piperazine | 2.03 | 1.40 | 1.61 | 1.95 | 1.10 |
| Temperature, ° F. (range) | 615–675 | 635–655 | 650–660 | 660–695 | 635–710 |
| Pressure, p.s.i.a | 14.7 | 14.7 | 14.7 | 14.7 | 14.7 |
| Composition of reactor effluent: | | | | | |
| Piperazine, wt. percent | 0.9 | 0.1 | 0.1 | 0.1 | 3.0 |
| N-$\beta$-hydroxyethyl piperazine, wt. percent | 0 | 0.2 | 0.1 | 0.1 | 0.1 |
| N,N'-di-$\beta$-hydroxyethyl piperazine, wt. percent | 0 | 0 | 0 | 0 | 0 |
| Triethylene diamine, wt. percent | 11.8 | 12.0 | 11.1 | 11.1 | 11.1 |
| Reactor effluent as wt. percent of liquid feed | 127 | 118 | 121 | 125 | 114 |
| Yield of triethylene diamine based on piperazine in the feed, wt. percent | 59.9 | 57.0 | 53.5 | 55.5 | 50.7 |

The substantially high triethylene diamine yields of Examples 1 through 5 are somewhat surprising since they were achieved with an inexpensive feedstock, considered to be not good for this reaction. Even so, a yield as high as 59.9 wt. percent was obtained in Example 1. The significance of such high yield operation is that the separate processing step required in commercial operation to separate compounds such as N-$\beta$-hydroxyethyl piperazine from unreacted piperazine at low conversions is eliminated.

A comparison with the yield data disclosed in U.S. Pat. 3,297,701 is revealing. In Example I of this patent, N-aminoethyl piperazine was reacted over silica-alumina catalyst in the presence of ammonia and resulted in a triethylene diamine yield of only 23 mole percent. Example II was carried out in essentially the same way as Example I, except for the replacement of the former catalyst with aluminum phosphate. The mole percent yield of triethylene diamine thereby obtained was 39%. Example XXI involved the preparation of triethylene diamine by the cyclization of N-hydroxyethyl piperazine over an aluminum phosphate catalyst with ammonia present. The resulting yield was only 33 wt. percent.

Thus, the economic advantages that the single step process of this invention have over the conventional two-step process are considerable. The costs associated with the purchase, installation, operation, and maintenance of a separate piperazine hydroxyethylation reaction and separation system are eliminated. High enough yields of the triethylene diamine product are obtainable, such that the recycling of unconverted piperazine for reprocessing is unnecessary.

EXAMPLE 6

By a procedure and with equipment similar to that described in Examples 1 to 5, a liquid feed totaling 128.2 grams and composed of 10.6 wt. percent piperazine, 77.3 wt. percent mixed xylenes, 1.5 wt. percent triethylene diamine and 11.1 wt. percent unidentified compounds was reacted with ethylene oxide in the ratio of 2.82 moles of ethylene oxide per mole of piperazine. A LHSV of 0.34 was used. The reaction took place in the presence of the same type of activated kaolin catalyst described in the previous examples. The reaction temperature range was 610–675° F. and the pressure atmospheric. The net yield of triethylene diamine was 20.6 wt. percent calculated by the same method as was used in Examples 1 to 5.

It should be understood that this invention is not limited to the foregoing examples since numerous variations and modifications could readily occur to those skilled in the art without departing from the scope of the following claims.

We claim:

1. A process for preparing triethylene diamine consisting of reacting piperazine directly with from about 1 to about 5 moles of ethylene oxide per mole of piperazine over a silica-alumina catalyst selected from the group consisting of activated kaolin, acid activated bentonite clays and gels of the silica alumina type at a temperature of 600°–750° F. and at a pressure of from 0.8 to 1.2 atmospheres.

2. The process of claim 1 wherein the reaction is conducted in the vapor phase at substantially atmospheric pressure.

3. The process of claim 1 wherein the silica-alumina catalyst is activated kaolin.

4. The process of claim 1 wherein the piperazine is added to the reaction dissolved in an inert solvent.

5. The process of claim 4 wherein said inert solvent is either water or xylene.

6. The process of claim 5 wherein water is the inert solvent and the resulting aqueous piperazine solution has a LHSV of 0.2 to 0.4.

7. The process of claim 1 wherein the mole ratio of ethylene oxide to piperazine is from about 1 to about 2.

8. The process of claim 3 wherein the piperazine is dissolved in an aqueous solution before reaction with the ethylene oxide which is present in the ratio of about 1 to about 2 moles of ethylene oxide per mole of piperazine, the reaction being in the range of 600–750° F. and at a pressure of 0.8 to 1.2 atmospheres.

9. The process of claim 8 wherein the reaction is conducted in the vapor phase at substantially atmospheric pressure.

References Cited

UNITED STATES PATENTS

| | | | |
|---|---|---|---|
| 3,036,076 | 5/1962 | Gabler | 260—268 R |
| 3,080,371 | 3/1963 | Spielberger et al. | 260—268 T |
| 3,297,701 | 1/1967 | Brader et al. | 260—268 T |
| 3,342,820 | 9/1967 | Brader | 260—268 SY |
| 3,369,019 | 2/1968 | Hamilton et al. | 260—268 SY |
| 3,400,129 | 9/1968 | Cour et al. | 260—268 T |
| 3,639,403 | 1/1972 | Muhlbauer | 260—268 SY |

DONALD G. DAUS, Primary Examiner

U.S. Cl. X.R.

260—268 R, 268 SY; 252—450